(12) United States Patent
Faries et al.

(10) Patent No.: US 10,483,760 B2
(45) Date of Patent: Nov. 19, 2019

(54) ENERGY STORAGE PEAK SHAVING OF ELECTRICAL POWER FOR FACILITIES

(71) Applicant: Raytheon Company, Waltham, MA (US)

(72) Inventors: William R. Faries, El Segundo, CA (US); Scott M. Baron, Cambridge, MA (US); John B. Rivera-Poventud, Clinton, MA (US); Mike Anderson, Nashua, NH (US); Alf L. Carroll, III, Marion, MA (US)

(73) Assignee: Raytheon Company, Waltham, MA (US)

( * ) Notice: Subject to any disclaimer, the term of this patent is extended or adjusted under 35 U.S.C. 154(b) by 563 days.

(21) Appl. No.: 13/828,016

(22) Filed: Mar. 14, 2013

(65) Prior Publication Data

US 2014/0266054 A1    Sep. 18, 2014

(51) Int. Cl.
*H02J 3/32*   (2006.01)
*H02J 3/00*   (2006.01)
*H02J 3/14*   (2006.01)

(52) U.S. Cl.
CPC ........... *H02J 3/32* (2013.01); *H02J 2003/003* (2013.01); *H02J 2003/146* (2013.01)

(58) Field of Classification Search
CPC ..................................... G05F 1/66; H02J 3/32

USPC .......................................... 700/296; 320/128
See application file for complete search history.

(56) References Cited

U.S. PATENT DOCUMENTS

| 4,731,547 | A | * | 3/1988 | Alenduff | H02J 3/48 |
| | | | | | 290/2 |
| 2006/0161450 | A1 | * | 7/2006 | Carey | G06Q 10/06 |
| | | | | | 705/412 |
| 2007/0124026 | A1 | * | 5/2007 | Troxell | G06Q 30/08 |
| | | | | | 700/291 |
| 2012/0013299 | A1 | * | 1/2012 | Prosser | B60L 11/1842 |
| | | | | | 320/109 |
| 2012/0109395 | A1 | * | 5/2012 | Finch | G06Q 50/06 |
| | | | | | 700/295 |
| 2013/0274935 | A1 | * | 10/2013 | Deshpande | H02J 3/28 |
| | | | | | 700/291 |

* cited by examiner

*Primary Examiner* — Drew A Dunn
*Assistant Examiner* — Harry O'Neill-Becerril

(57) ABSTRACT

A method of shaving peak power consumption by a facility includes determining a target peak demand setpoint for a facility and measuring power consumed by the facility. An electrical storage system (ESS) is charged when the measured power consumption is below the target peak demand setpoint. Additionally, the ESS is discharged and provides power to the facility when the measured power consumption is above the setpoint. Further, as data for the facility and ESS changes, the target peak demand setpoint is updated.

20 Claims, 8 Drawing Sheets

US 10,483,760 B2

ENERGY STORAGE PEAK SHAVING OF ELECTRICAL POWER FOR FACILITIES

TECHNICAL FIELD

This disclosure is generally directed to systems that provide electrical power to facilities. More specifically, this disclosure is directed to a method of utilizing energy storage in order to reduce levels of peak demand on electrical power for facilities, also called peak shaving.

BACKGROUND

Electrical Utility companies often charge customers a premium based upon their peak power demand for any period during billing cycle, in addition to the charges based upon their consumption. These demand charges are in place by the utility to account for the customers whose peak load differs greatly from the nominal load. This is primarily true for Commercial and Industrial customers. The Electrical Utility must maintain reserve capacity to supply all customers' peak demand at any time. Since the duration of these periods of high demand may only account for a relatively small percentage of time the utility may be operating far above the level of actual demand and consuming more fuel than necessary. The discrepancy between the nominal demand and peak demand can be quantified by measuring the load factor. The load factor is determined by taking the average demand for a given period and dividing it by the maximum measured load maintained for a specified time (e.g., fifteen minutes) observed during that period, yielding a percentage. A low load factor is an indication that the customer's peak demand during the billing cycle far exceeded the nominal demand whereas a high load factor indicates that the customer's demand was relatively constant across the billing cycle. Other measures exist as well for determining demand charges.

SUMMARY

This disclosure provides a system that reduces peaks of power consumption by using electrical energy storage systems.

According to an embodiment, a method of shaving peak power consumption by a facility includes determining a target peak demand setpoint for a facility and ensuring the maximum facility demand supplied by the electrical utility does not exceed this point. An electrical storage system (ESS) is charged when the measured power consumption is below the target peak demand setpoint. Additionally, the ESS is discharged in order to provide supplemental power to the facility when the measured power demand is above the setpoint. Furthermore, as the power demand of the facility and ESS changes, the target peak demand setpoint is updated as necessary to minimize the peak load on the utility for each period.

Certain embodiments may provide various technical advantages depending on the implementation. For example, a technical advantage of some embodiments may include the capability to shave peaks of power consumption from a power profile of a facility. A technical advantage of other embodiments may include the capability to reduce utility charges by peak shaving. Yet another technical advantage may include the capability for providing a void through a rotation limiting structure.

Although specific advantages are above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 10, described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system.

For many commercial and industrial facilities, the cost of electricity charged by an electrical utility company is partially based on premiums charged for peaks or spikes of power consumption. The more peaks or spikes in power demand a facility has, the more reserve power storage the utility company needs maintain in order to meet any sudden demand of the facility.

As alluded to above, one measure an electrical utility company may use to determine the discrepancy between the nominal demand and peak demand can be quantified by measuring the load factor. The demand factor is determined by taking the average demand for a given period and dividing it by the maximum measured load maintained for a specified time (e.g., fifteen minutes), observed during that period, yielding a percentage. A low load factor is an indication that the customer's peak demand during the billing cycle far exceeded the nominal demand whereas a high load factor indicates that the customer's demand was relatively few constant across the billing cycle. Other measures exist as well for determining demand charges. Yet other measures also exist for calculating peaks.

Figure 1:
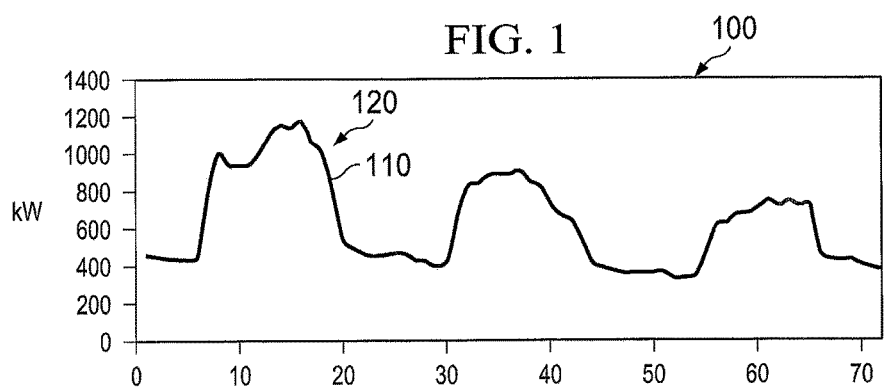
FIG. 1 show a graph, illustrating an example load profile.

FIG. 1 show a graph 100, illustrating an example load profile. In graph 100, a line 100 represents the load profile. For the given period (0-70) shown in FIG. 1, a peak power 120 of 1174 kW is reached. If this were the billing cycle, the load factor would be the average for this entire period divided by this peak power—yielding a load factor of 53% in this particular scenario.

Depending on the utility company, the rates for peak demand charges (resulting in low load factors) can be significant. Accordingly, for every kW reduced from the peak power (the denominator in the load factor equation), savings can be obtained. "Peak shaving" generally refers to processes whereby these peak levels of power demand are reduced.

Given the above negative effects of peak power demands, certain embodiments of the disclosure provide a peak shaving algorithm and corresponding system, which are used in conjunction with an electrical storage system. In certain embodiments, this algorithm and corresponding system changes the grid purchase profile for end users (military, industrial or commercial). Additionally, in certain embodiments, this algorithm and corresponding system avoids peak charges from utility companies, providing flexibility for rate negotiations with the utility company. As described in more detail below, in certain embodiments, the method is dynamic and self-correcting to adapt to changes. Such changes include scenarios where energy storage capacity fades and scenarios where load profile changes to due weather patterns or internal loads (e.g., new equipment).

Figure 2:
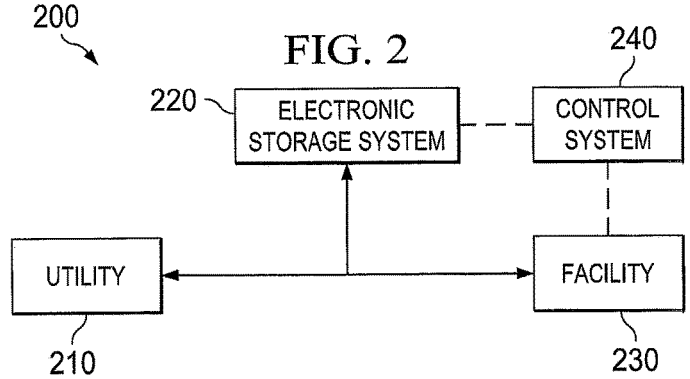
FIG. 2 show a general schematic of utilization of an energy storage system (ESS) for peak shaving, according to an embodiment of the disclosure.

FIG. 2 show a general schematic of utilization of an energy storage system (ESS) for peak shaving, according to an embodiment of the disclosure. In FIG. 2, the box for the utility 210 generally represents a utility company, an electrical grid, or a supplier from which electrical power is obtained. The box for the facility 230 generally represents a building, group of buildings, or facility that consumes electrical energy from the utility 210. The box for the energy storage system (ESS) 220 represents any suitable energy storage system or systems including, but not limited to, electro-chemical batteries, pumped hydroelectric, compressed air energy storage (CAES), molten metal batteries and any other system that can store energy. The box for control system 240 represents a control system that communicates with both the building 230 and the ESS 220. The control system 240 may communicate with the facility in any suitable manner, including wired or wireless communication.

The use of a control system 240 and the ESS 220 can help a facility 230 alter its load profile by charging during time periods when the demand at the facility 230 is at its lowest and discharging at time periods when the demand at the facility 230 is at its highest. The determination as to when to switch between discharging and discharging is determined by the control system 240 as will be described in further details below. This combination of charging/discharging with the ESS simultaneously raises valley areas of the load profile and lowers the peak areas of the load profile while maintaining the overall area underneath the curve, which represents the total energy required for a facility. Viewed alternatively and excluding inefficiencies of an ESS, the control system 240 does not alter the amount of power pulled from the utility 210 for the facility 230. Rather, the control system 240 allows a smoothing allows a smoothing of the variances at which power is pulled from the utility 210 by charging or discharging of the ESS 220 as appropriate.

Figure 3:
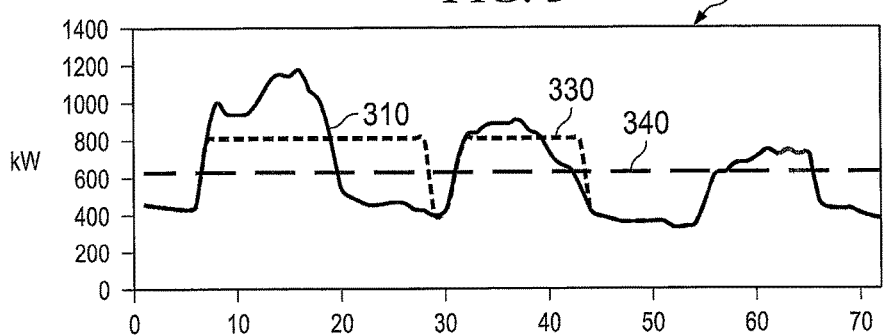
FIG. 3 shows a graph, according to an embodiment of the disclosure.

FIG. 3 shows a graph 300, according to an embodiment of the disclosure. The graph 300 shows how the load profile of FIG. 1, which is represented by line 310, can be modified. In FIG. 3, line 330 represents the actual power consumption pulled from the power grid. One can see that the peak demand from the power grid has been reduced to 805 kW—a difference of 370 kW from the prior actual peak.

For this model, a target peak demand (TPD) setpoint was chosen (here, 805 kW). Then, through control of the ESS, the ESS charged when the load was below that level and discharged when the load was above that level. In operation, the more the load profile can be flattened, the more the cost savings.

While flattening of the load profile to unity (line 340 in FIG. 3) provides the most ideal cost savings situation, there are realistic limitations and challenges in achieving such a unity load profile.

The energy storage capacity for an ESS is finite. For a given energy storage application there is a limit on the size of the energy storage capacity. Additionally, while it may be ideal to have a very large ESS, the capital requirements for purchasing an ESS will require that the size of the unit be limited to its most optimal use and return on investment (ROI).

The charge and discharge power level of the ESS also has limits. For a given size of an ESS, the actual amount of power that the ESS can charge or discharge at any one point in time is limited by the energy storage technology. For example, electrochemical reactions can only occur so fast for batteries. Thus, for example, if you have an ESS that can only discharge a maximum of 200 kW of power, such a maximum amount of power is the largest differential you can have in your system from the setpoint.

Future power needs are also hard to predict. It is easy to look back at the historical energy usage of a facility and determine how an ESS could have been used to get the best cost savings. However, it is extremely difficult to forecast how an energy storage system will be used for months ahead of time for peak shaving because load demand is seasonally and weather dependent. Many of the largest loads on buildings are due to environmental control systems for buildings such as air conditioning systems. Since weather is difficult to predict beyond 48 hours, this makes it a challenge to predict the load profile for a building for a given month.

In addition to the above, the information at hand is variable. Accordingly, another consideration is the available information that one has in to make a decision for the TPD setpoint. Since the billing cycles for most facilities are month to month and the energy usage for a facility is seasonal then, a new TPD setpoint may need to be selected for each billing cycle. The information at hand at the time that the decision needs to be made will be the fundamental to making this decision. Having at least one year's historical energy usage information is useful (although not required) in order to make an informed decision to calculate initial TPD setpoints. The system will collect usage information (and store in a database) as the system is operational so that it can be used for future TPD predictions.

Among the variable data that the embodiments of the disclosure will use in a decision making process for TPD setpoints are the following:
1. Historical demand load data of load source,
2. The pricing rate schedule from the utility company,
3. The energy storage system properties and constraints,
4. Success of previous months attempts at peak shaving, and
5. Weather Forecasting data.

Figure 4:
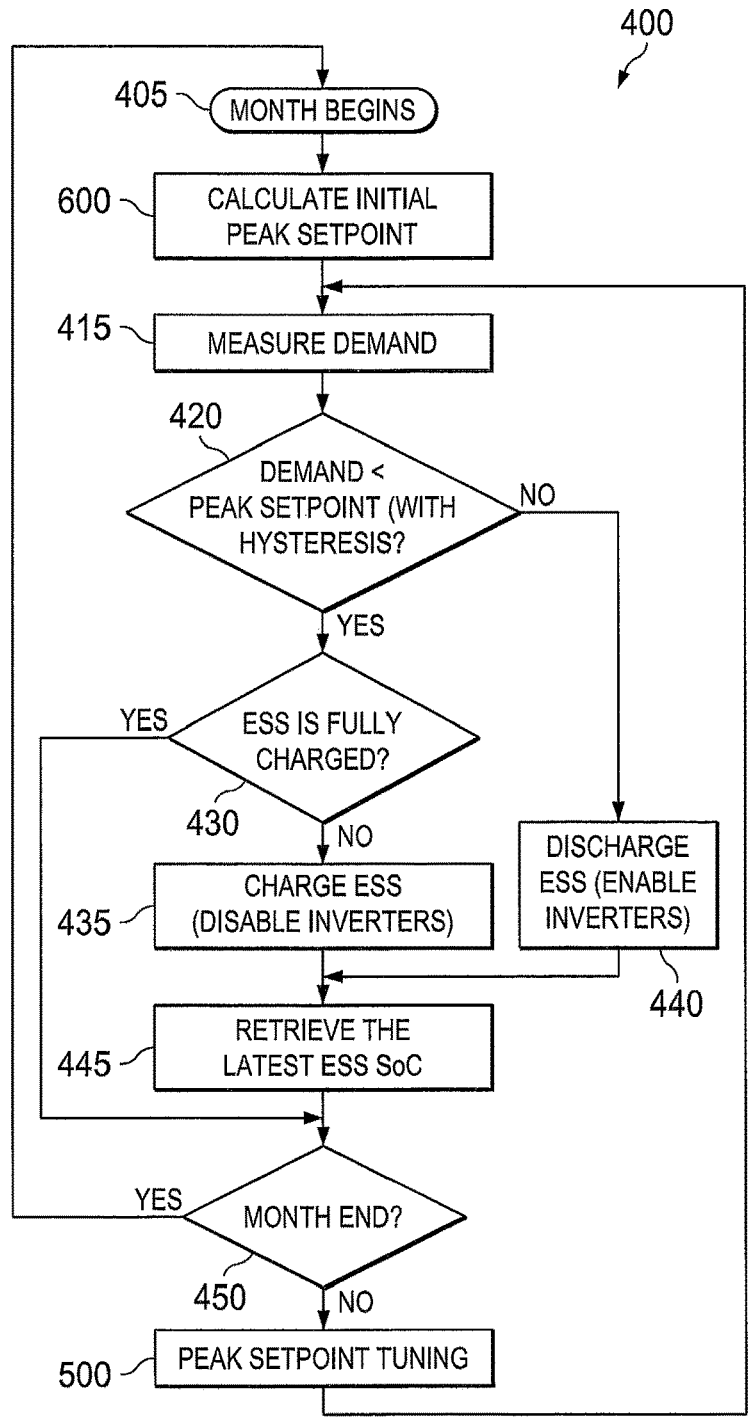
FIG. 4 illustrates a process of peak shaving, according to an embodiment of the disclosure.

FIG. 4 illustrates a process 400 of peak shaving, according to an embodiment of the disclosure.

The process 400 begins just before a particular billing cycle. For a particular month, the process initiates at step 405 and calculates an initial peak setpoint at process 600. Further details of the process 600 are described below with reference to FIG. 6.

At step 415, the demand is measured. Then, a determination is made at step 420 as to whether the demand is less than the peak setpoint (with hysteresis). If not, the process 400 proceeds to step 440 where there is a discharge of the ESS, for example, by enabling inverters. If so, the process proceeds to step 430.

At step 430, there is a determination as to whether the ESS is fully charged. If so, the process 430 proceeds to step 450. If not, the process 400 proceeds to step 435 where there is a charging of the ESS, for example, by disabling the inverters.

From either step 440 or step 435, the process 400 proceeds to step 445 where there is a reading of the latest state of charge of the ESS. From step 445 or step 430, the process 400 proceeds to step 450 where there is a determination as to whether the end of the month has been reached. If so, the next month begins at step by returning to step 405. If not, the process goes through a process 500 of peak setpoint tuning, which is described further with reference to FIG. 5.

Figure 5:
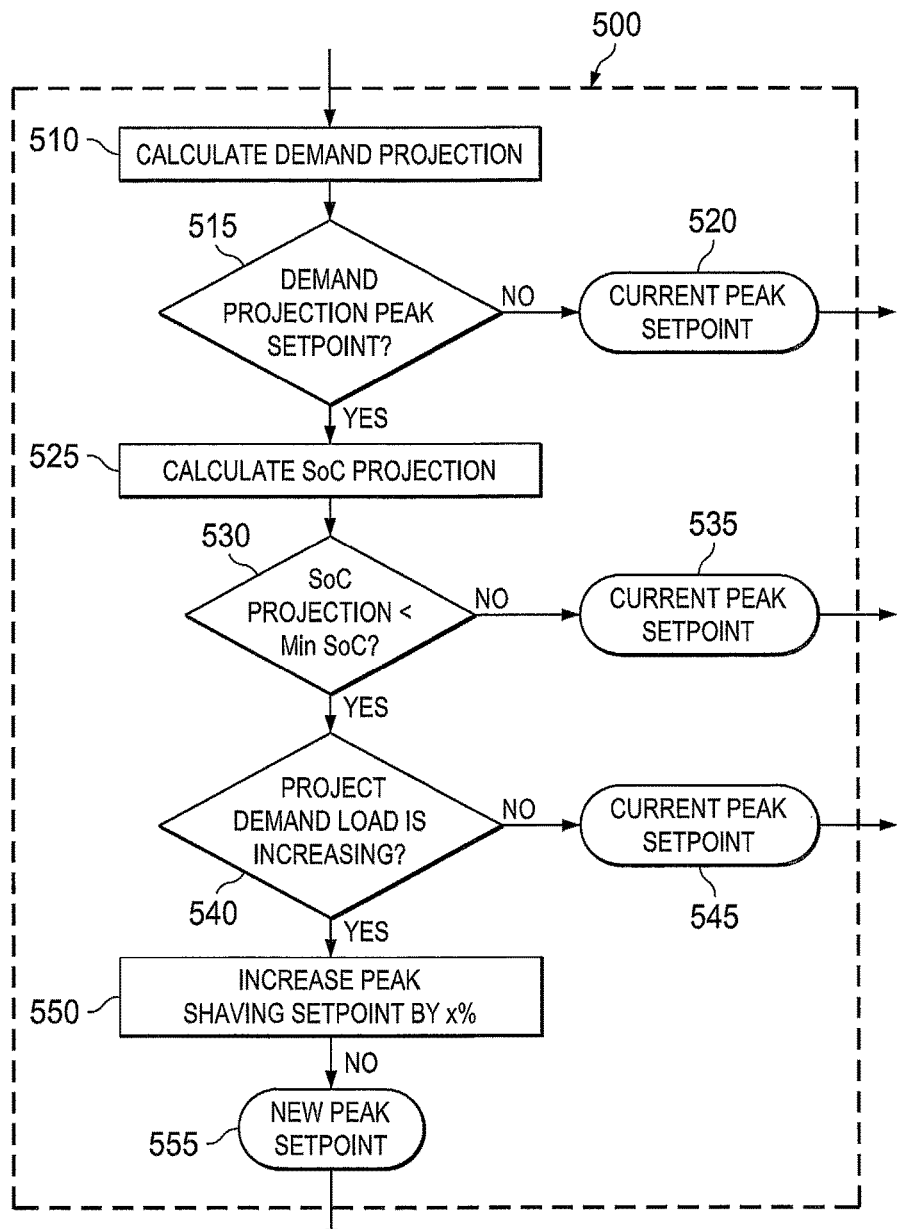
FIG. 5 illustrates a process of determining whether an initial peak setpoint needs to be modified, according to an embodiment of the disclosure.

FIG. 5 illustrates a process of determining whether an initial peak setpoint needs to be modified. A variety of things may occur during a month that change the load profile including, but not limited to, changed weather conditions and modified internal loads (e.g., due to new equipment or new use of a building).

By providing an ability to modify the setpoint during a billing cycle, unanticipated peaks may be avoided that could occur, for example, because the ESS does not have enough capacity to meet anticipated new demand. In such scenarios, it is better to bias the setpoint upwards than to experience a spike.

As shown in process 500, a variety of checks may be performed to determine if the setpoint should remain the same (e.g., output at steps 520, 535, and 545) or be changed to a new setpoint at step 555.

After calculating the demand projection at step 510 (current demand+historical trend), a first check is encountered at step 515. At step 515, a determination is made as to whether the demand projection is going to be greater than the peak setpoint. If not, the current peak setpoint is left alone at step 520. If so, the process proceeds to step 535.

At step 525, the process 500 calculates a state of charge before determining at step 530 whether a state of charge projection is less than a minimum state of charge. If not, the current peak setpoint is left alone at step 535. If so, the process 500 proceeds to step 540.

At step 540, the process 500 determines where the project demand load is increasing. If not, the current peak setpoint is left alone at step 545. If so, the process proceeds to step 550.

At step 550, the process increases the peak shaving setpoint by a pre-defined percentage. In particular embodiments, this percentage may correspond to calculation made in other steps of process 500. At step 555, this new setpoint is used for subsequent iterations within the month, including further iterations of process 500 where in such subsequent iterations, the new peak setpoint becomes the current peak setpoint.

Figure 6:
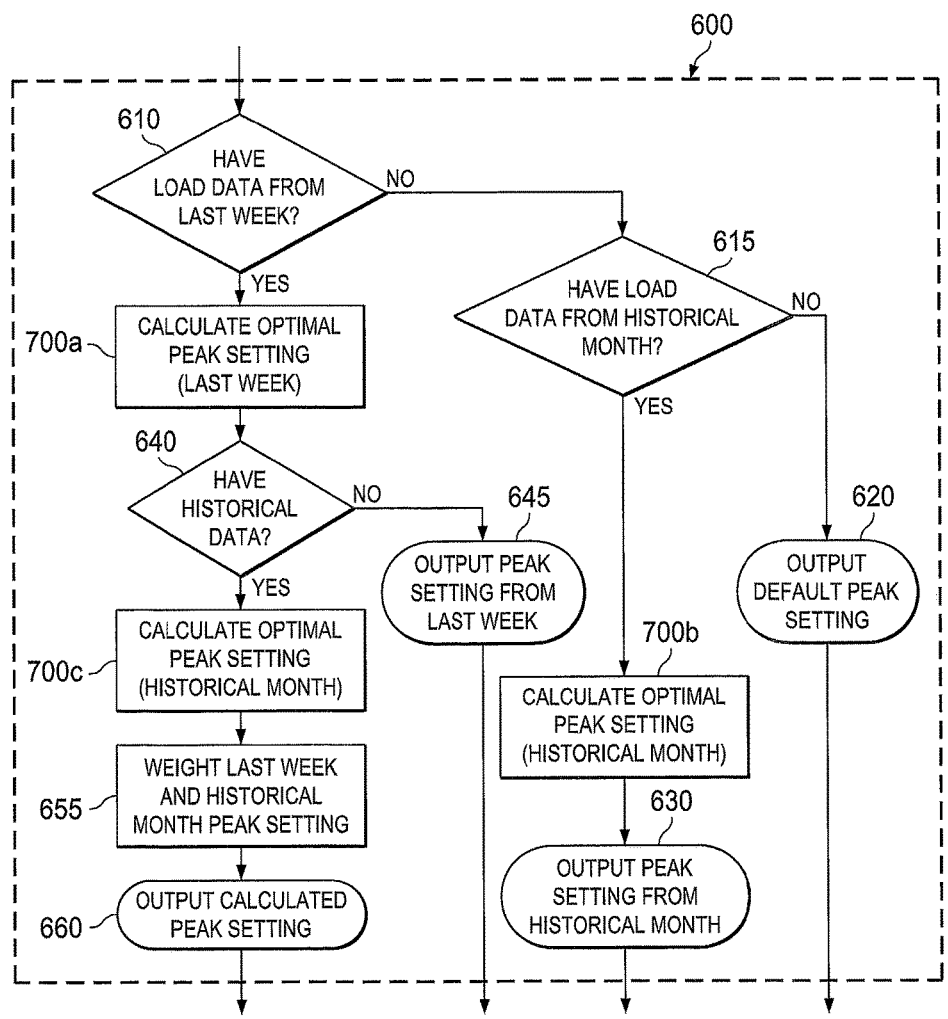
FIG. 6 illustrates a process of determining an initial setpoint based on available data, according to an embodiment of the disclosure.

FIG. 6 illustrates a process 600 of determining an initial setpoint based on available data, according to an embodiment of the disclosure. Although the data in process 600 will primarily reference historical data concerning load profiles and ESS characteristics with reference to FIGS. 7A and 7B, it should be recognized by one of ordinary skill in the art that weather forecast data may also be utilized. For example, historical data may suggest a particular power profile; however, weather forecasts may suggest a deviation from the historical power profile. Accordingly, the general reference to historical data may also include weather forecasts.

At step 610, a determination is made as to whether there is data from the previous week. In particular embodiments, this may be data from previous runs of process 400, including any deviations from peak setpoint tuning in process 500. If no such data exists, the process 600 looks at a broader swath of data in step 615 to determine whether there is load data from a historical month. If not, a default peak setting may be used at step 620 as an output for process 600.

If load data is available from last week at step 610, the process 600 moves to process 700a. Additionally, if load data is available for a historical month at step 615, the process 600 moves to process 700b. Both of processes 700a and 700b are optimization settings based on the respective available data—here, load data from past week and historical month settings. Further details on the optimization based on these particular types of data are described in FIGS. 7A and 7B.

After obtaining the optimized value from step 700b, the output peak setting form historical month data is set at step 630 for an output for the process 600.

After obtaining the optimized value from step 700a, a determination is made at step 640 as to whether there is historical data. If not, the optimized value from the output peak setting of load data from last week is set at step 645 for an output for the process 600. If such historical data is available, further optimization occurs at process 700c, considering the further available data. After obtaining the optimized value at process 700c, at step 655, there is a weighting of the two respective values from processes 700a and 700c. After such weighting, the optimized value is set at step 660 for an output of the process 600. Although a particular arrangement of steps and processes are shown, one of ordinary skill in the art will recognize that alternative ordering may occur. For example, in particular embodiments, processes 700a and 700c along with step 655 could be integrated.

Figure 7A:
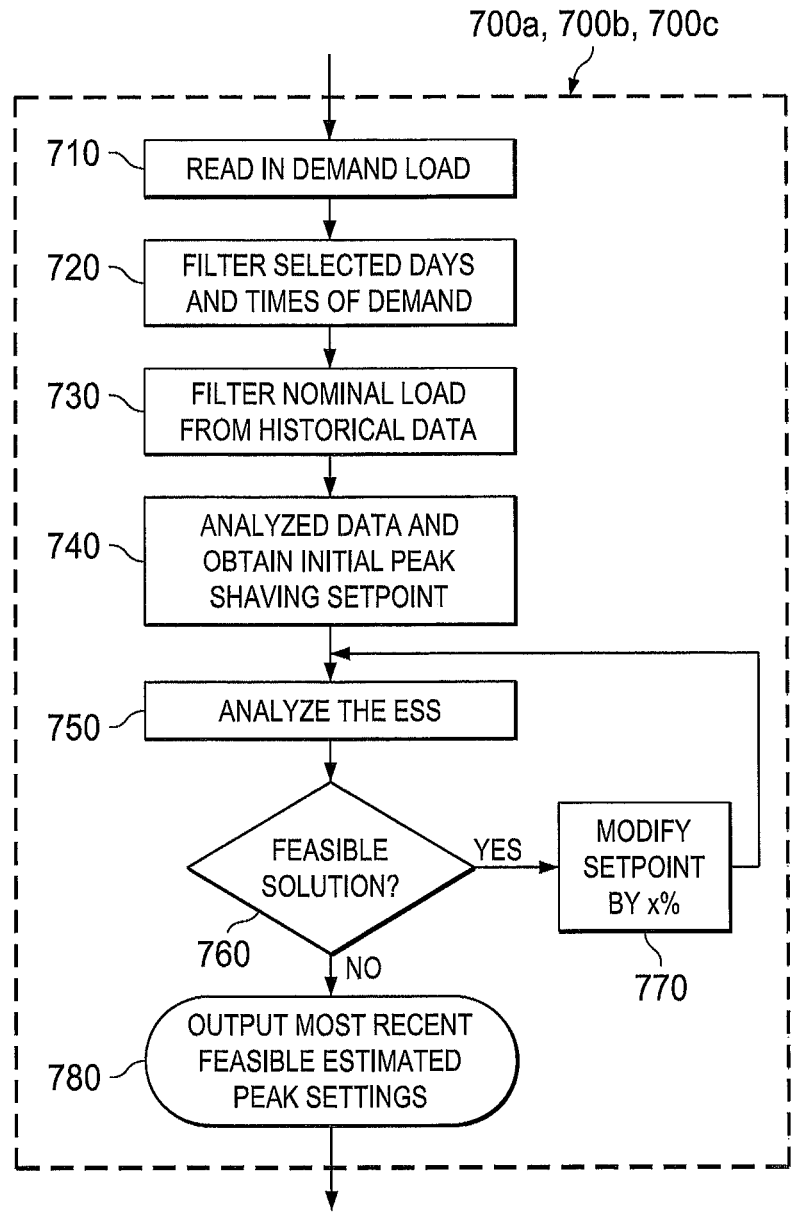
FIGS. 7A and 7B illustrate alternative processes of determining an optimal setpoint, according to embodiments of the disclosure.
Figure 7B:
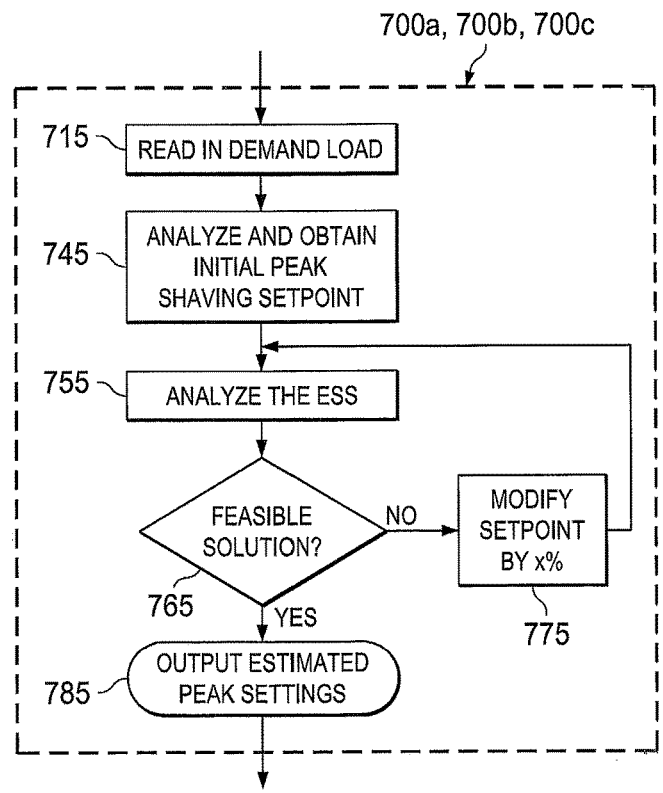

FIGS. 7A and 7B illustrate alternative processes of determining an optimal setpoint, according to embodiments of the disclosure. According to particular embodiments, the processes 700a, 700b, 700c from FIG. 6, alone or in combination with other steps may be carried out in either manner set forth in FIG. 7A or 7B.

In the processes set forth in FIGS. 7A and 7B, optimization is a function of the following types of data: historical demand load data of load source, pricing rate schedules from the utility company, ESS properties and constraints, success of previous month's attempts at peak shaving and characteristics, and weather forecasting data. The process set forth in FIG. 7A maximizes this function by modifying a setpoint until the characteristics of the ESS no longer provide a feasible solution for the setpoint. The process set forth in FIG. 7B maximizes this function by modifying a setpoint until the characteristics of the ESS provides a feasible solution. In other words, FIG. 7A assumes the values begin with one that is feasible whereas FIG. 7B assumes the values begin with ones that are not.

As shown in FIG. 7A, a demand load is read at step 710. This may be the historical data described in FIG. 6. Selected days and times of demand may be filtered out at step 720. Additionally, a nominal load may be filtered out from the historical data at step 730. In particular embodiments, such filtering may alleviate an undesired skewing of the data for analysis.

At step 740, the data is analyzed and the initial peaking shaving setpoint is obtained. As a non-limiting example, available data from the prior week's data may suggest an upward trend in demand. This value may also be supported by available weather forecasts. Yet other examples will become apparent to one of ordinary skill in the art after reviewing this disclosure.

At step 750, the ESS is analyzed. Among other things, a variety of performance characteristics may be analyzed. Non-limiting examples include the ESS's round-trip efficiency and charge/discharge characteristics. As referenced earlier, if you have an ESS that can only discharge a maximum of 200 kW of power then that is the max at which your peak demand differential can be set. Additionally, if the ESS charges slowly, such characteristics may be considered according to particular embodiments. Furthermore, the economic gain based on price differential from peak-shaving versus the energy lost from the round-trip efficiency may also be considered.

At step 760, the feasibility of the solution is considered. As alluded to above, two types of feasibility may be considered according to particular embodiments: (1) technical feasibility, and (2) economic feasibility. The former considers whether the ESS, itself, has the wherewithal to handle the proposed scenario. The latter considers whether it makes economic sense given utility rates and the efficiency of the ESS—even if ESS is technically capable of performing the proposed scenario. Particular embodiments may consider one or both of such feasibilities.

If the solution is considered to be feasible (technically, economically, or both), a modification occurs at step 770 and the process iterates again and again with slight modification until the solution is no longer considered feasible. At that point, step 780 obtains the last feasible solution from prior iterations and uses this solution as the setpoint.

As shown in FIG. 7B, the process follows a similar set of steps to the steps in FIG. 7A. Similar to step 710, step 715 reads in a demand. Similar to step 740, step 745 analyzes data to obtain an initial peak shaving setpoint. Although not shown, the process in FIG. 7B may also include steps similar to steps 720 and 730.

Similar to step 760, step 765 determines whether the solution is feasible or not. If not, the setpoint is modified at step 775 and a reiteration occurs until a feasible solution is obtained—yielding an output at step 785.

Although FIGS. 7A and 7B provide particular examples of optimizing a set-point based on different points of data, one of ordinary skill in the art will recognize (after having read the present disclosure) that other optimization techniques may be utilized. As a non-limiting example, with each respective data point fed into a master function that considering each point of data, a maximum of minimum value of the function would yield the optimum setpoint. Yet other methods of optimizing may also be utilized.

Figure 8:
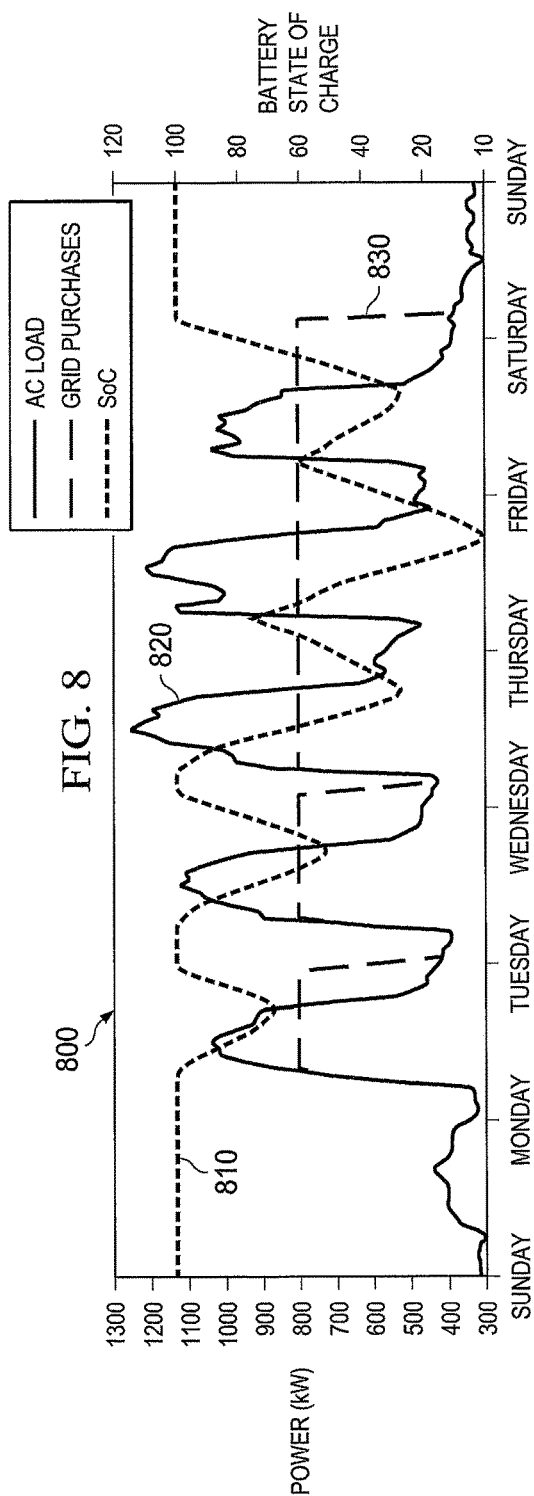
FIG. 8 is a chart illustrating, according to an embodiment of the disclosure, the interaction between: the load profile, the energy obtained from the grid, and the ESS charge level.

FIG. 8 is a chart 800 illustrating, according to an embodiment of the disclosure, the interaction between: the load profile, the energy obtained from the grid, and the ESS charge level. Line 810 represents the state of charge of the ESS as shown on the right side of the chart with values of 0 to 100. Line 820 represents the AC load consumed by the particular facility as shown on the left side of the chart with power in kW. Line 830 represents purchases made from the grid as also shown on the left side of the chart with power in kW. One can see that a setpoint of roughly 800 kw is utilized in this particular time frame.

Beginning the week shown, the ESS is completely charged. As the typical work week begins on Monday, the AC load consumed crosses the 800 kW threshold and power is pulled from ESS as opposed to extra power from the grid. This can be seen by the flat portion of line 830 on mid-day Monday. This can also be seen by with the gradual decrease in charge shown on mid-day Monday.

As Monday comes to a close and less power is consumed, the AC load consumed (as shown again by line 820) decreases and crosses the 800 kw threshold once again. As this cross-over occurs, the ESS begins to charge one again. By Wednesday of the week, the ideal unity scenario occurs where the grid purchases are the threshold amount.

Figure 9:
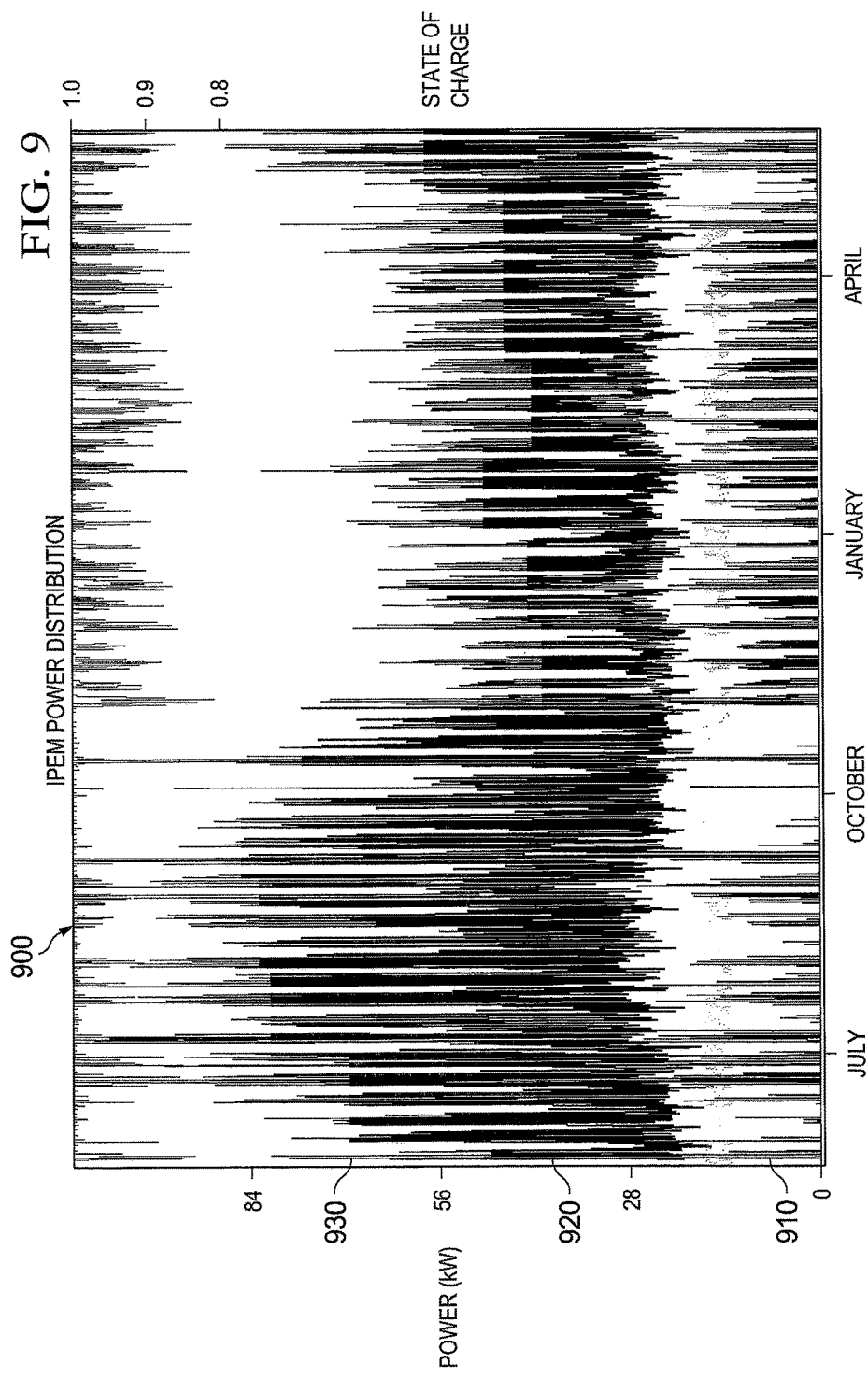
FIG. 9 is a chart, illustrating a simulation according to an embodiment of the disclosure.

FIG. 9 is a chart 900, illustrating a simulation according to an embodiment of the disclosure. The chart 900 shows peak-point shaving over a year. Lines 910 represents ESS supplied power. Lines 920 represent grid supplied power. Lines 930 represent power consumed by the facility, which is a combination of the ESS supplied power and the grid supplied power.

One can see that the peaks over the year have been shaved with the portions extending over lines 920. One can also see that setpoints have been modified over the year, according to particular seasons. For example, in July the setpoint extends above 56 KW whereas in January, the setpoint is below 56 KW.

Figure 10:
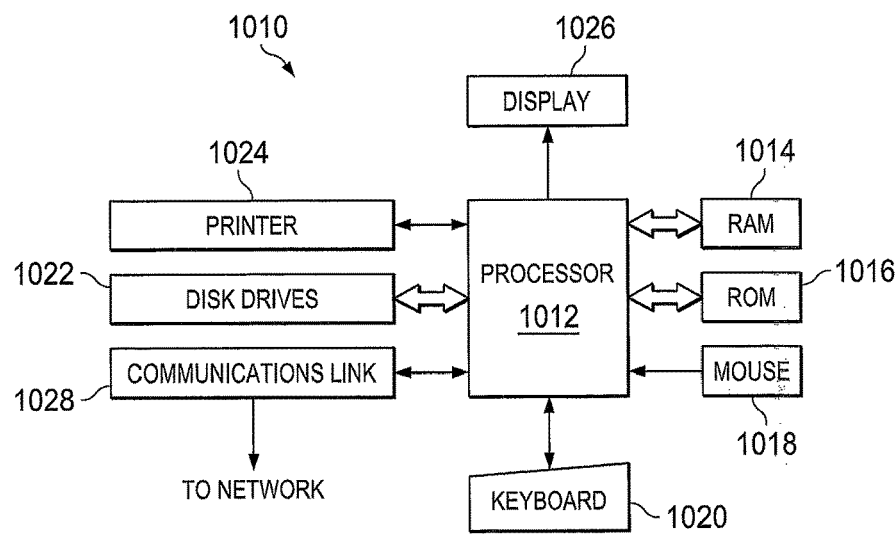
FIG. 10 is an embodiment of a general purpose computer that may be used in connection with other embodiments of the disclosure.

FIG. 10 is an embodiment of a general purpose computer 1010 that may be used in connection with other embodiments of the disclosure to carry out any of the above-referenced functions. In particular embodiments, the general purpose computer may correspond to the control system 240 of FIG. 1.

General purpose computer 1010 may generally be adapted to execute any of the known OS2, UNIX, Mac-OS, Linux, Android and/or Windows Operating Systems or other operating systems. The general purpose computer 1010 in this embodiment includes a processor 1012, a random access memory (RAM) 1014, a read only memory (ROM) 1016, a mouse 1018, a keyboard 1020 and input/output devices such as a printer 1024, disk drives 1022, a display 1026 and a communications link 1028. In other embodiments, the general purpose computer 1010 may include more, fewer, or other component parts. Embodiments of the present disclosure may include programs that may be stored in the RAM 1014, the ROM 1016 or the disk drives 1022 and may be executed by the processor 1012 in order to carry out functions described herein. The communications link 1028 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 1022 may include a variety of types of storage media such as, for example, floppy disk drives, hard disk drives, CD ROM drives, DVD ROM drives, magnetic tape drives or other suitable storage media. Although this embodiment employs a plurality of disk drives 1022, a single disk drive 1022 may be used without departing from the scope of the disclosure.

Although FIG. 10 provides one embodiment of a computer that may be utilized with other embodiments of the disclosure, such other embodiments may additionally utilize computers other than general purpose computers as well as general purpose computers without conventional operating systems. Additionally, embodiments of the disclosure may also employ multiple general purpose computers 1010 or other computers networked together in a computer network. Most commonly, multiple general purpose computers 1010 or other computers may be networked through the Internet and/or in a client server network. Embodiments of the disclosure may also be used with a combination of separate computer networks each linked together by a private or a public network.

Several embodiments of the disclosure may include logic contained within a medium. In the embodiment of FIG. 10, the logic includes computer software executable on the general purpose computer 910. The medium may include the RAM 1014, the ROM 1016, the disk drives 1022, or other mediums. In other embodiments, the logic may be contained within hardware configuration or a combination of software and hardware configurations.

The logic may also be embedded within any other suitable medium without departing from the scope of the disclosure. Additionally, in particular embodiments, certain, some, or all of the logic may be performed automatically without human intervention.

It will be understood that well known processes have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of shaving peak power consumption by a facility, the method comprising:
   determining a target peak demand setpoint for the facility, wherein the target peak demand setpoint is determined for a billing cycle;
   measuring power consumed by the facility;
   causing an electrical storage system (ESS) to be charged with power from a utility when the measured power consumption is below the target peak demand setpoint;
   causing the ESS to discharge and provide power to the facility while the facility simultaneously receives power from the utility when the measured power consumption is above the target peak demand setpoint; and
   dynamically updating, during the billing cycle, the target peak demand setpoint based on one or more changed conditions;
   wherein the target peak demand setpoint is determined initially by (i) determining a first optimal target peak demand setpoint using first demand load data from a time period immediately prior to a current billing cycle, (ii) determining a second optimal target peak demand setpoint using second demand load data from a billing cycle from a historical time period, and (iii) weighting the first and second optimal target peak demand setpoints; and
   wherein each of the first and second optimal target peak demand setpoints is determined using a process that (i) determines an initial target peak demand setpoint value by filtering out selected time segments and a nominal load from at least one of the first and second demand load data, (ii) iteratively modifies the initial target peak demand setpoint value according to one or more efficiency characteristics of the ESS until the modified target peak demand setpoint value is not economically feasible in view of the one or more efficiency characteristics of the ESS and one or more utility rates associated with the utility, and (iii) uses a last economically feasible target peak demand setpoint value among prior iterations as the first or second optimal target peak demand setpoint.

2. The method of claim 1, wherein the one or more changed conditions include a demand projection for the facility, a state of charge projection for the ESS, and a projection that demand is increasing.

3. The method of claim 1, wherein the target peak demand setpoint is further determined based on attempts at peak shaving in prior billing cycles.

4. The method of claim 1, wherein the target peak demand setpoint is further determined based on weather forecasting data.

5. The method of claim 1, wherein the target peak demand setpoint is determined based on at least one of: an energy capacity, a round trip efficiency, or a maximum power output of the ESS.

6. The method of claim 1, wherein the target peak demand setpoint is dynamically updated as data, concerning at least one of the facility or the ESS, changes.

7. A system for shaving peak power consumption by a facility, the system comprising:
   a controller configured to:
      determine a target peak demand setpoint for the facility, wherein the controller is configured to determine the target peak demand setpoint for a billing cycle;
      measure power consumed by the facility;
      cause an electrical storage system (ESS) to be charged with power from a utility when the measured power consumption is below the target peak demand setpoint;
      cause the ESS to discharge and provide power to the facility while the facility simultaneously receives power from the utility when the measured power consumption is above the target peak demand setpoint; and
      dynamically update, during the billing cycle, the target peak demand setpoint based on one or more changed conditions;

wherein the controller is configured to initially determine the target peak demand setpoint by (i) determining a first optimal target peak demand setpoint using first demand load data from a time period immediately prior to a current billing cycle, (ii) determining a second optimal target peak demand setpoint using second demand load data from a billing cycle from a historical time period, and (iii) weighting the first and second optimal target peak demand setpoints; and wherein the controller is configured to determine each of the first and second optimal target peak demand setpoints using a process that (i) determines an initial target peak demand setpoint value by filtering out selected time segments and a nominal load from at least one of the first and second demand load data, (ii) iteratively modifies the initial target peak demand setpoint value according to one or more efficiency characteristics of the ESS until the modified target peak demand setpoint value is not economically feasible in view of the one or more efficiency characteristics of the ESS and one or more utility rates associated with the utility, and (iii) uses a last economically feasible target peak demand setpoint value among prior iterations as the first or second optimal target peak demand setpoint.

8. The system of claim 7, wherein the one or more changed conditions include a demand projection for the facility, a state of charge projection for the ESS, and a projection that demand is increasing.

9. The system of claim 7, wherein the controller is further configured to determine the target peak demand setpoint based on attempts at peak shaving in prior billing cycles.

10. The system of claim 7, wherein the controller is further configured to determine the target peak demand setpoint based on weather forecasting data.

11. The system of claim 7, wherein the controller is configured to determine the target peak demand setpoint based on at least one of: an energy capacity, a round trip efficiency, or a maximum power output of the ESS.

12. The system of claim 7, wherein the controller is configured to dynamically update the target peak demand setpoint as data, concerning at least one of the facility or the ESS, changes.

13. The method of claim 1, wherein the target peak demand setpoint is further determined based on weather data associated with at least some of the first or second demand load data.

14. A non-transitory computer readable medium containing instructions that when executed cause at least one processing device to:
    determine a target peak demand setpoint for a facility, wherein the target peak demand setpoint is determined for a billing cycle;
    measure power consumed by the facility;
    cause an electrical storage system (ESS) to be charged with power from a utility when the measured power consumption is below the target peak demand setpoint;
    cause the ESS to discharge and provide power to the facility while the facility simultaneously receives power from the utility when the measured power consumption is above the target peak demand setpoint; and
    dynamically update, during the billing cycle, the target peak demand setpoint based on one or more changed conditions;

wherein the target peak demand setpoint is determined initially by (i) determining a first optimal target peak demand setpoint using first demand load data from a time period immediately prior to a current billing cycle, (ii) determining a second optimal target peak demand setpoint using second demand load data from a billing cycle from a historical time period, and (iii) weighting the first and second optimal target peak demand setpoints; and wherein each of the first and second optimal target peak demand setpoints is determined using a process that (i) determines an initial target peak demand setpoint value by filtering out selected time segments and a nominal load from at least one of the first and second demand load data, (ii) iteratively modifies the initial target peak demand setpoint value according to one or more efficiency characteristics of the ESS until the modified target peak demand setpoint value is not economically feasible in view of the one or more efficiency characteristics of the ESS and one or more utility rates associated with the utility, and (iii) uses a last economically feasible target peak demand setpoint value among prior iterations as the first or second optimal target peak demand setpoint.

15. The non-transitory computer readable medium of claim 14, wherein the one or more changed conditions include a demand projection for the facility, a state of charge projection for the ESS, and a projection that demand is increasing.

16. The non-transitory computer readable medium of claim 14, wherein the target peak demand setpoint is further determined based on attempts at peak shaving in prior billing cycles.

17. The non-transitory computer readable medium of claim 14, wherein the target peak demand setpoint is further determined based on weather forecasting data.

18. The method of claim 1, wherein the target peak demand setpoint is determined based on at least some of the first or second demand load data, a pricing rate schedule from the utility, and one or more properties of the ESS.

19. The method of claim 1, wherein the process further considers technical feasibility of the ESS when iteratively modifying the initial demand setpoint value.

20. The system of claim 7, wherein the process further considers technical feasibility of the ESS when iteratively modifying the initial demand setpoint value.

* * * * *